United States Patent
Luukkanen

(10) Patent No.: US 9,636,611 B2
(45) Date of Patent: May 2, 2017

(54) METHOD FOR REMOVING THE PRECOAT LAYER OF A ROTARY FILTER

(71) Applicant: ANDRITZ OY, Helsinki (FI)

(72) Inventor: Pentti Luukkanen, Kerimaki (FI)

(73) Assignee: Andritz Oy, Helsinki (FI)

( * ) Notice: Subject to any disclaimer, the term of this patent is extended or adjusted under 35 U.S.C. 154(b) by 212 days.

(21) Appl. No.: 14/377,040

(22) PCT Filed: Feb. 5, 2013

(86) PCT No.: PCT/FI2013/050125
§ 371 (c)(1),
(2) Date: Aug. 6, 2014

(87) PCT Pub. No.: WO2013/117812
PCT Pub. Date: Aug. 15, 2013

(65) Prior Publication Data
US 2015/0290566 A1    Oct. 15, 2015

(30) Foreign Application Priority Data
Feb. 6, 2012  (FI) ..................................... 20125125

(51) Int. Cl.
*B01D 33/46* (2006.01)
*B01D 37/02* (2006.01)
(Continued)

(52) U.S. Cl.
CPC ............ *B01D 33/463* (2013.01); *B01D 33/21* (2013.01); *B01D 33/466* (2013.01); *B01D 37/02* (2013.01); *D21C 11/0064* (2013.01)

(58) Field of Classification Search
CPC ..... B01D 33/463; B01D 37/02; B01D 33/466; B01D 33/21; D21C 11/0064
See application file for complete search history.

(56) References Cited

U.S. PATENT DOCUMENTS 2,022,069 A * 11/1935 Whitmore .............. B01D 33/21
210/327
2,102,780 A * 12/1937 Blelfeldt .............. B01D 33/466
210/193
(Continued)

FOREIGN PATENT DOCUMENTS

FI      875275      5/1988
FI      931636      10/1994
(Continued)

Primary Examiner — Krishnan S Menon
Assistant Examiner — Liam Royce
(74) Attorney, Agent, or Firm — Nixon & Vanderhye P.C.

(57) ABSTRACT

A method associated for treating a precoat on a rotating filtering surface of lime sludge filter including: accumulating a precoat of lime sludge on the filtering surface by rotating the filtering surface in a first direction through a lime sludge slurry; after accumulating the precoat, rotating the filtering surface in an opposite direction to the first direction; while rotating the filtering surface in the opposite direction, spraying a liquid onto the precoat on the filtering surface wherein the spraying is applied to the precoat above a scraper adjacent the filtering surface and the spraying removes at least a portion of the precoat from the filtering surface, and flowing the removed precoat over the scraper and into a basin.

17 Claims, 2 Drawing Sheets

Figure 1:
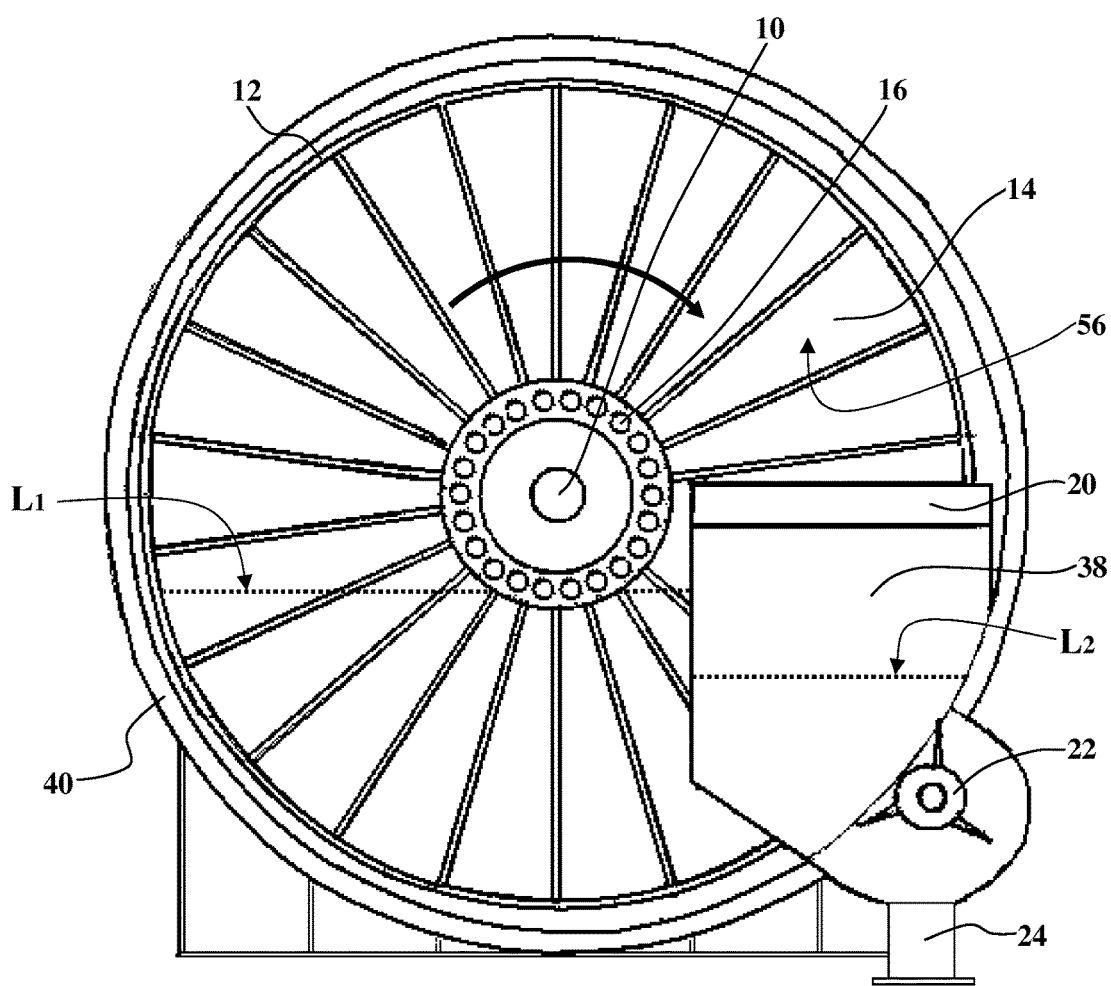

(51) Int. Cl.
*B01D 33/21* (2006.01)
*D21C 11/00* (2006.01)

(56) References Cited

U.S. PATENT DOCUMENTS

| | | | | |
|---|---|---|---|---|
| 2,598,606 | A | * | 5/1952 | Robison, Jr. ......... B01D 33/073 210/391 |
| 2,839,194 | A | * | 6/1958 | Lopker .............. B01D 33/0016 210/193 |
| 4,370,231 | A | * | 1/1983 | LaValley ............ B01D 33/0012 210/404 |
| 4,500,086 | A | * | 2/1985 | Garavuso ................ B65H 5/068 198/457.07 |
| 4,668,342 | A | * | 5/1987 | Blackwell .......... D21C 11/0064 162/30.11 |
| 4,687,583 | A | * | 8/1987 | Lankinen ............... B01D 37/02 210/739 |
| 5,149,448 | A | | 9/1992 | Mattelmaki |
| 5,897,788 | A | | 4/1999 | Ketolainen et al. |
| 9,187,863 | B2 | * | 11/2015 | Hogebrandt ........... D21C 11/04 |
| 2010/0213142 | A1 | | 8/2010 | Andersson et al. |

FOREIGN PATENT DOCUMENTS

| | | |
|---|---|---|
| JP | 63-028415 | 2/1988 |
| WO | 2011078749 | 6/2011 |
| WO | 2011159235 | 12/2011 |

* cited by examiner

METHOD FOR REMOVING THE PRECOAT LAYER OF A ROTARY FILTER

This application is the U.S. national phase of International Application No. PCT/FI2013/050125 filed 5 Feb. 2013 which designated the U.S. and claims priority to FI 20125125 filed 6 Feb. 2012, the entire contents of each of which are hereby incorporated by reference.

OBJECT OF THE INVENTION

The invention relates to rotary filters, such as disc and drum filters where a precoat layer is used in assisting the filtration. Especially the invention is suited for precoat removal in filtering lime sludge of the chemical pulping industry.

PRIOR ART

A precoat layer is commonly used in filtering processes and it is especially advantageous in filtering white and green liquor of the chemical pulping industry, whereby the material to be filtered itself acts as the precoat. One and the same layer cannot be used continuously, since it gets clogged by fines. The layer has to be periodically removed and be replaced by a new layer. The normally used technique is to automatically move the scrapers according to a certain program closer to the filtering surface for at least one rotation and to return them back, whereby a clogged surface layer can be removed, but only partially. When a scraper has this way several times approached the filtering surface, the precoat layer is totally removed and a new precoat layer is created. The replacement of the precoat is typically performed 3-8 times per day. The more efficient the precoat removal is the less is disturbs the operation of the filter and the downstream subprocesses.

The precoat is removed from the filtering surfaces usually by blowing pressurized gas backwards through the filtering surface or by subjecting the precoat to powerful liquid sprays. In both cases the precoat is removed above the scraper. The precoat removal can also be performed by slurrying it in the filter basin by means of liquid sprays below the scraper, as in the method presented in U.S. Pat. No. 5,897,788 or after the filtering surface has risen from the basin, as in the method presented in U.S. Pat. No. 5,149,448.

PROBLEMS RELATING TO PRIOR ART

When the precoat is removed by blowing, the filtering cloth and other device surfaces inside the filter are to be occasionally washed by means of high pressure liquid sprays in order to prevent their fouling from hampering the operation of the filter. The blowing method requires complex channeling structures for controlled removal of the precoat and washing means of the filtering surface and the interior areas and therefore the apparatus will be expensive.

Precoat containing lime sludge sticks onto surfaces extremely well. It easily forms hard deposits that are hard to remove and they can clog channels or otherwise hamper the operation of the filter, especially the moving parts thereof.

When the precoat is removed by directing liquid sprays above the scraper, a large portion of the used liquid leaks from between the scraper and the filtering surface into the basin, where it dilutes the lime milk. This dilution is desirably avoided in order to assist in reusing the liquor as a filtrate.

When the liquid sprays are directed into the rotational direction of the filter or perpendicularly to the filtering surface, the sprays continuously has to pass through the layer before the layer is removed from where the spray hits. Simultaneously a powerful spray presses the precoat against the wire and inside it. Splashes from the precoat also hamper the hitting of the spray onto the uncovered filtering surface, and thus the washing thereof. A very large amount of water and/or high spraying pressure or several nozzles or more than one filter revolution are required in order to remove the precoat from the filtering surface and on ensure proper washing of the wire surface at the same time. The amount of water that is used and that gets into the basin is thus very high.

When the liquid sprays are located below the scraper or after the filtering surface has risen from the basin, the sprayed liquid dilutes the slurry in the basin and thus the filtrate to be recovered.

The precoat can be removed in narrower strips instead of the whole width of the filtering surface, as presented in U.S. Pat. No. 5,897,788 or U.S. Pat. No. 5,149,448. However, this has no influence especially on the dilution problem, which is only intensified, if the precoat removal is continuous. When the operation is uninterrupted, lime mud layers are not regularly removed from the interior of the apparatus, while that is easy to do when removing the whole width of the precoat layer.

Filters are expensive and essential apparatuses and methods and devices intensifying their operation should be such that they can be performed also to existing apparatuses with the least possible changes, in order to keep the costs and production breaks small. Further, the downstream processes after the filtration may be disturbed by production breaks.

THE PURPOSE AND SOLUTION OF THE INVENTION

The present invention provides a solution for the above problems. An efficient solution has been developed that is easily and even without major changes performed in conjunction with present apparatuses.

The invention relates to a method and an apparatus, where removal of precoat can be performed efficiently by means of water sprays above the scraper so that the filtering surfaces of the filter are rotated to a direction opposite to the filtering process. More precisely, the solution according to the present invention is characterized in what is presented in the independent claims.

When the liquid sprays located above the scraper are directed sloping downwards against the normal rotational direction of the filter, the liquid efficiently penetrates between the precoat and the filtering surface and scrapes off the precoat, most preferably during one rotation of the filter. Also the filtering surface below the precoat is efficiently cleaned, when the spray removing the precoat can hit directly onto its surface, and the pressure of the removal spray does not push the precoat against the wire and inside it.

The releasing precoat drops into the lime sludge chutes without splashes disturbing the washing of the uncovered filtering surface. The precoat moving aside during the washing closes the space between the scraper and the filtering surface so that leaking of the liquid into basin is prevented before the layer has been totally removed. Further, the upwards rising filtering surface hampers the flow downwards, which also decreases leakage between the scraper and the filtering surface.

Because the method is quick, and the use thereof does not have any major effect on the concentration of the solution in the basin, there is no need to always stop the filter feed. Even when the feed is stopped, the stoppage remains short. When the precoat is delivered to a drop chute instead of a basin, two main capacity-related advantages will be realized. Firstly, when the precoat needs to be replaced, it is blocked by the finest particles. If they are returned back to the basin they will cause blocking again. By removing them from the process, the periods of time between the precoat removals are substantially longer and the filtering capacity is increased. Secondly, the removed precoat will be part of the production flow of the filter and does not need to be filtered twice.

The blades of the scraper may not need to be moved to a different position during the precoat removal. When the precoat has already been removed, e.g. in connection with the washing of the wire, bringing the blades close is advantageous when there is a desire to minimize bypassing of liquid into the basin.

To avoid damages to the filter because of increased thickness of the cake, scraping the precoat thinner is advantageous to perform just before the removal of the precoat. To prevent the increase of thickness, reducing the pressure difference or emptying the basin may also be performed e.g. a half of a rotation before the removal of the precoat.

After the precoat is removed, there is a short time for some liquid to be sprayed into the basin from between the scraper and the filtering surface, despite the countercurrently moving filtering surface. However, the amount is much smaller than when operating in conventional ways. This is partly an advantageous phenomenon, because the passing liquid spray simultaneously can remove lime sludge layers accumulated onto the lower side surfaces of the scraper. Due to this cleaning effect, the liquid spray can be used extra time after the precoat is removed, if needed.

Advantages of the method and apparatus according to the invention include e.g.:

Changes in the apparatus are minimal,
production break is shortened and periods of time between them are longer,
the solution in the basin is not unnecessarily diluted,
the precoat is released in an easier, more reliably and more efficiently when the liquid spray is directed against the rotational direction between the precoat and the surface of the filter,
the precoat removal can be performed efficiently, with minimal liquid amounts and spraying pressures and with almost no disturbance for the apparatus and
the filtering surface as well as the area below the scraper can be washed with the same nozzles in the same event.

LIST OF DRAWINGS

Figure 2:
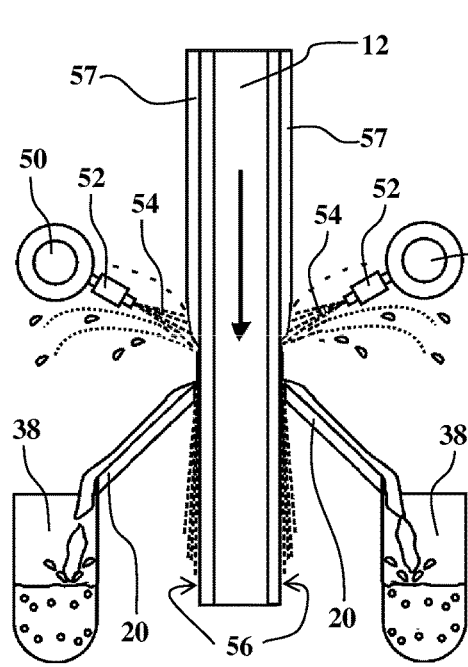
Figure 3:
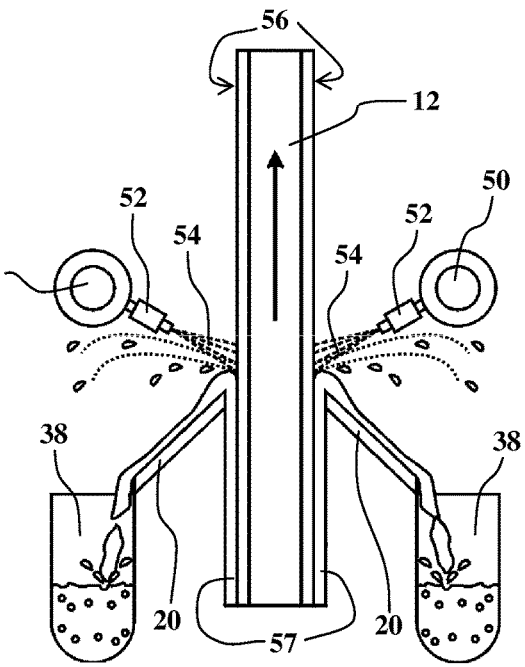
Figure 4:
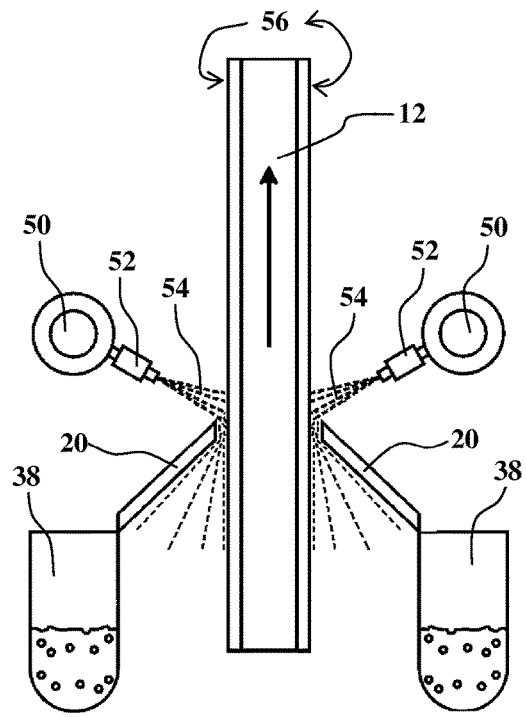

In the following, the invention is disclosed in more detail with reference to the appended drawings, of which FIG. 1 illustrates general features of a disc filter apparatus, FIG. 2 illustrates a disc filter arrangement of prior art used in precoat removal, seen from the side of the scraper, FIG. 3 illustrates an arrangement according to an embodiment of the invention used in precoat removal, seen from the side of the scraper, and FIG. 4 illustrates the washing of the lower surfaces of the scraper according to an embodiment of the invention, seen from the side of the scraper.

DETAILED DESCRIPTION OF THE INVENTION

FIG. 1 illustrates general features of a filter disc used in lime sludge filtration. A drum filter may be used as an alternative type of filter as it operates according to the same principle. The filtering surfaces 56 of a drum filter are on the cylinder surface of the drum, and in a disc filter they are on both sides of the discs.

The disc filter comprises a rotary shaft 10 that is hollow or otherwise provided with filtrate flow channels 16. The shaft 10 is supported at its ends and connected via bearings to the frame of the apparatus, in which the drive devices are arranged. The shaft 10 is connected to drive devices (not shown), such as a motor, a reduction gear etc. A number of filter discs 12 are arranged on the shaft, which discs comprise sectors 14 having wire coated filtering surfaces 56 on both sides. Filtrate coming from sectors 14 is led out of the filter via flow channels 16, which may be combined to discharge into a hollow shaft 10.

In order to ensure functional operation of the filter, a pressure difference is created between the inner and outer sides of the filtering surfaces 56. Therefore the interior of the filter is pressurized e.g. by means of an air compressor to produce the pressure difference. Alternatively or in addition, pressure difference can be created or increased by means of a vacuum source connected to the flow channels 16 of the shaft 10. The pressure difference can be adjustable and it can be switched off e.g. by means of a valve.

The lower part of the filter discs 12 are submerged in lime sludge slurry fed into as basin 40. The surface L1 of the slurry in the basin 40 extends to a level where it completely covers the sector 14 that is at the bottom dead center. As the filter disc 12 rotates in the basin 40, lime sludge is accumulated on the filtering surface 56 forming a cake, and the liquid filtrate passes through the filtering surface. At first, a precoat 57 (in FIG. 2) layer is usually formed on the filtering surfaces 56 for assisting the filtration. After being filtered, the cake may be washed, whereby the cake is flushed with washing liquid sprays as displacement wash. Then the cake is dried, usually to be as dry as possible.

A scraper 20 is arranged on a declined level slightly above the slurry level L1 in the basin 40 on both sides of the filter disc 12. The distance between the scraper 20 and the filtering surface 56 is usually adjustable. The scraper 20 is located in the vicinity of the slurry level L1 in order to maximize the drying period of the cake. The scraper 20 scrapes off filtered lime sludge layer being on the filtering surface 56 or on the precoat layer 57 on the filtering surface. On the scraper 20 the lime sludge layer flows from between the discs 12 into a drop chute 38 that is separated from the basin 40. Lime sludge is accumulated in the drop chute 38 approximately to the height of level L2. The drop chute 38 may be provided with a mixer 22, which mixes the dried lime sludge with the liquid being fed into the drop chute, so that the lime sludge can flow in slurried form out of the apparatus via channel 24.

FIG. 2 illustrates a conventional arrangement in connection with the removal of the precoat 57 performed on a two-sided filter disc 12. The disc 12 of the disc filter rotates to the same direction used in a normal filtering process. Liquid sprays 54 exiting from downwards sloping nozzles 52 remove the precoat 57 from the surface of the disc 12 and the exiting lime sludge flows into the chute 38. The liquid being sprayed is usually mainly water.

The scraper 20 may be moved closer to the filtering surfaces 56 before removal of precoat 57, whereby it assists in the removal by reducing the thickness thereof. The scraper 20 cannot be moved to touch the filtering surface 56, because that would lead to breakage of the filtering surface. Therefore, a portion of the sprayed liquid always gets from between the scraper 20 and the filtering surface 56 into the basin 40. The rotational motion towards to basin 40 intensifies this leakage flow. Because the liquid sprays 54 do not directly penetrate under the precoat 57, but the precoat is partly removed by slurrying, the method is relatively slow. Intensifying the removal by increasing the amount of liquid being sprayed or the spraying pressure leads to stronger dilution of the slurry in the basin 40, and possibly to damages of the wire.

FIG. 3 illustrates an arrangement according to the invention. The rotational direction is changed to the opposite, i.e. the precoat 57 to be removed rises from below the scraper 20. It is efficiently and reliable removed by means of liquid spray 54 penetrating directly between the precoat 57 and the filtering surface 56. The precoat 57 is removed, partially in pieces and flows into the basin 40. The precoat 57 moving upwards on the disc 12 and acts as a barrier preventing the liquid being sprayed from getting into the basin via a gap between the scraper 2 and the precoat 57.

The spray nozzles 52 are mounted to direct the liquid spray 54 sloping downwards. A smaller hitting angle onto the filtering surface 56 assist in removing the precoat 57 and a wider angle intensifies the washing of the filtering surface 56. Most preferably the set angle between the nozzle 52 of the liquid spray 54 and the filtering surface 56 moving to the opposing direction is in the vertical direction 25-70 degrees.

Most preferably the change of the rotational direction is performed by means of an inverter adjusting the rotational speed of the electric motor that moves the filter disc. The inverter has a special advantage in that during the removal of the precoat 57 it allows an easier way to use optimized and preferably greater rotational speeds and not the same as during the filtering.

If an inverter is not available, a three-phase motor can change its direction by connecting two phases instead of to each other e.g. by means of relays or mechanical switches. Also other commonly known methods or mechanical transmissions can be used for changing the rotational direction of the filter's motor or the drum, and if needed, also its rotational speed.

While the filter is in operation, the lime sludge layer accumulated onto the filtering surface 56 is at its thinnest after the scraper 20 and get continuously thicker as it passes forward at the basin 40. If the filtering is not stopped by partially or totally releasing the pressure difference e.g. half of a rotation before changing the rotational direction, the lime sludge layer would grow also when traveling a second time in the basin into a different direction and when stopping during the change of direction. The filtered layer may be substantially thicker when it returns to the gap between the scraper 20 and the filtering surface 56. This may cause damages to the structure of the filter and the filtering surfaces 56 particularly can easily get broken or eroded.

The alteration of the thickness of the cake can be taken into account in the distance between the scraper 20 and the filtering surface 56, so that the cake does not have to be packed between the scraper and the filtering surface. The distance to the filtering surface 56 may be increased to correspond to the thickest point before removing the precoat 57, but then for a portion of the precoat removal cycle, a larger gap will remain between the cake and the scraper 20.

Although the precoat 57 being removed acts as an efficient barrier for the liquid passing into the basin, the slot between it and the scraper 20 can be minimized if needed either based on experience based knowledge or on knowledge based on observations of measurements by changing the position of the scraper 20 in accordance with the thickness alteration. The metering information can be obtained e.g. by measuring the lime sludge layer's thickness or the slot between the scraper 20 and the pulp layer e.g. by means of measuring devices operating mechanically, capacitively or optically.

The precoat 57 can be scraped thin just before it is removed to avoid damages. If in the same connection the filtering is stopped by decreasing the pressure difference and/or emptying the basin e.g. back into the causticizing tank or lime sludge tank, the precoat 57 remains thin and of uniform thickness. Then it is more efficiently removed by using less liquid and lower spraying pressures and the position of the scraper 20 need not be changed during the removal. When the precoat 57 is of uniform thickness, the conditions for its removal, such as rotating speed and spraying pressure can best be optimized and too high a spraying pressure can be avoided, and the use of liquid can be limited.

It may not be necessary for removing the precoat 57 to move the scrapers 20 closer to the filtering surface 56. If after the removal there is e.g. a desire, for instance for washing of the filtering surface, to decrease the amount of water passing into the basin 40, the scrapers 20 can be brought closer to better guide the liquid into the drop chute 38 instead of the basin 40.

The nozzles 52 in disc filter are located at different distances from the shaft 10, i.e. the moving speed of the filtering surface increases towards the outer circumference, so that the nozzles 52, the spraying pressure and the positioning angle may at different distances from the shaft 10 be adapted to be different for optimizing the spraying conditions.

The washing of the filtering surface 56 taking place in connection with the removal of the precoat 57 can be intensified by using, in addition to the liquid sprays 54 removing the precoat 57, washing sprays (not shown), which are directed to the point where the filtering surface 56 has been completely uncovered. In these washing sprays, the most suitable spraying pressures and nozzles and the directing angle for especially washing the filtering surface 56 can be used. The washing conditions can be optimized also depending on the distance of the nozzle from the central shaft 10. These washing nozzles can be connected to a flow duct 50, which is either the same as or a different from that of the nozzles 52. This or these flow duct(s) 50 can be arranged rotatable around its longitudinal axis, so that the directing of the sprays can be best optimized in every situation. E.g. after removing the precoat 57, it may be advantageous to change the directing for more efficient washing of the filtering surface 56 or the components of the apparatus.

In connection with the removal of the precoat 57, also blowing of air or liquid in a known way to the inner side of the filtering surface 56 may be directed at least to the zone where removal of the precoat 57 is taking place.

FIG. 4 illustrates how after the removing of the precoat 57, lime sludge accumulated onto the lower surfaces of scraper 20 can be flushed away, if needed, by means of liquid passing to the lower slide of the scraper via the gap between the scraper 20 and the filtering surface 56. By appropriate directing of the removal sprays 54 or the washing sprays, an adequately cleaning effect is obtained by means of a small liquid amount.

The liquid spray could remove the precoat 57 using the normal rotating direction as well and diluting the solution in the basin still less, if it was inclined upwardly against the rotating direction of the filtering surface 56. This is not easy to perform in practice, since then the spray would be directed upwards and it would splash around the liquid and the layer being removed and would foul the whole apparatus, which inevitably would lead to repeated extra maintenance operations. However, this might possibly be performed adequately by covering the spraying point, if there is space for that in the apparatus. Further, efficient cleaning of the lime sludge layers off the surfaces of these covers and surfaces that get fouled would need to be arranged.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. A method of removing a lime sludge-containing precoat accumulated on a filtering surface of a disc or drum filter filtering lime sludge of the chemical pulp industry, the method comprising:
spraying a liquid towards the filtering surface above a scraper to remove the lime sludge-containing precoat from the filtering surface, wherein the precoat is a layer between the filtering surface and a filtering layer on the disc or drum filter;
while spraying the liquid to remove the lime sludge-containing precoat, rotating the filtering surface in a first rotating direction opposite to a second rotating direction, and
while rotating the filtering surface in the second direction, spraying the liquid towards the filtering surface and above the scraper to pass the liquid sequentially through the filtering layer, the precoat and the filtering surface and thereafter removing the filtering layer from the precoat while maintaining the precoat on the filtering surface during a lime sludge filtering process performed by the disc or drum filter.

2. The method according to claim 1, further comprising reversing the second rotational direction of the filtering surface to the first rotational direction before or while the spraying of the liquid occurs, wherein an inverter is used to cause the reversal of the second rotational direction to the first rotational direction.

3. The method according to claim 1 wherein the spraying of the liquid includes spraying the liquid in a downwardly inclined direction to remove the lime sludge-containing precoat from the filtering surface.

4. The method according to claim 1 wherein a pressure difference applied to the filtering surface is decreased or eliminated prior and/or during the spraying of the liquid to remove the lime sludge-containing precoat.

5. The method according to claim 1 wherein the spraying of the liquid continues after the removal of the lime sludge-containing precoat to wash surfaces of the scraper and/or the filtering surface.

6. The method according to claim 1 further comprising emptying a basin of the filter into a causticizing tank before the spraying of the liquid to remove the lime sludge-containing precoat.

7. The method according to claim 1 further comprising scraping the lime sludge-containing precoat prior to and/or during the spraying of the liquid to remove the lime sludge-containing precoat.

8. The method according to claim 1 further comprising applying a gas or liquid pressure to an inner surface of the filtering surface during the spraying of the liquid.

9. A method to remove a lime sludge-containing precoat on a rotating filtering surface of lime sludge filter, the method comprising:
accumulating the lime sludge-containing precoat of lime sludge on the filtering surface by rotating the filtering surface in a first direction through a lime sludge slurry;
after accumulating the lime sludge-containing precoat, using the lime sludge-containing precoat to filter lime sludge collecting on the lime sludge-containing precoat as the rotating filter surface rotates, in the first direction, through the lime sludge slurry;
while the rotating filter surface rotates in the first direction, removing the lime sludge collected on the lime sludge-containing precoat without removing the lime sludge-containing precoat;
rotating the filtering surface in an opposite rotational direction to the first rotational direction;
while rotating the filtering surface in the opposite direction, spraying the liquid onto the lime sludge-containing precoat on the filtering surface wherein the spraying is applied to the lime sludge-containing precoat above a scraper adjacent the filtering surface and the spraying removes at least a portion of the lime sludge-containing precoat from the filtering surface, and
after the removal of at least a portion of the lime sludge-containing precoat, moving the at least a portion of the lime sludge-containing precoat over the scraper and into a basin.

10. The method according to claim 9 wherein the spraying of the liquid onto the precoat includes spraying the liquid in a downwardly inclined direction towards the lime sludge-containing precoat.

11. The method according to claim 9 further comprising:
applying a reduced pressure to a side of the filtering surface opposite to a side of the filtering surface supporting the lime sludge-containing precoat, wherein the reduced pressure is applied while accumulating the lime sludge-containing precoat, and
reducing or stopping the application of the reduced pressure during a period while rotating the filtering surface in the opposite direction.

12. The method according to claim 9 wherein the spraying of the liquid continues after the removal of the lime sludge-containing precoat to wash the scraper and/or the filtering surface.

13. The method according to claim 9 further comprising emptying the basin into a causticizing tank before the at least a portion of the lime sludge-containing precoat flows into the basin.

14. The method according to claim 9 wherein the lime sludge slurry is in the basin while the filtering surface is rotated through the slurry.

15. The method according to claim 9 further comprising scraping the lime sludge-containing precoat prior to and/or during the spraying of the liquid to remove the lime sludge-containing precoat.

16. The method according to claim 9 further comprising applying a gas and/or liquid to an inner surface of the filtering surface during the spraying of the liquid, wherein the applied liquid and/or gas applies a pressure to the inner side greater than a pressure applied to an outer side of the filtering surface.

17. The method according to claim 9 further comprising, after removing the at least a portion of the lime sludge-containing precoat, accumulating a lime sludge-containing precoat of lime sludge on the filtering surface by rotating the filtering surface in the first direction through a lime sludge slurry.

* * * * *